ELECTRON TUBE SOCKET FOR PRINTED-CIRCUIT PANELS

Filed Sept. 25, 1961

INVENTORS
WILLIAM T. JENSEN
EDWIN E. GEHRT
BY Kemon, Palmer, Stewart & Estabrook
ATTORNEYS United States Patent Office 3,147,060
Patented Sept. 1, 1964

3,147,060

ELECTRON TUBE SOCKET FOR PRINTED-CIRCUIT PANELS

William T. Jensen, Libertyville, and Edwin E. Gehrt, Melrose Park, Ill., assignors to Methode Electronics, Inc., Chicago, Ill., a corporation of Illinois Filed Sept. 25, 1961, Ser. No. 140,592
4 Claims. (Cl. 339—194)

This invention relates to electron tube sockets and more particularly to sockets which are adapted for use with printed circuit panels. Specifically, the present invention relates to a so called wafer type socket for mounting miniature tubes on printed circuit panels.

Electron tube sockets for printed circuit panels must be capable of easy insertion into preformed openings in printed circuit panels with a minimum of effort and must, once inserted into the panel, be sufficiently self supporting therein to facilitate subsequent dip soldering operations to effect soldered electrical connections between the printed circuit wiring and the connector elements of the sockets which receive the prongs of the tube.

Accordingly, it is the principal object of the present invention to provide an electron tube socket for printed circuit panels which has the foregoing desirable properties.

A further object of this invention is to provide a wafer type tube socket of such configuration as to facilitate the assembly of the prong-receiving connector members in the insulating body.

A still further object of the invention is to provide a wafer type electron tube socket which when assembled is capable of withstanding repeated insertion and withdrawals into preformed openings in printed circuit panels without disturbing the rigidity of the tube socket assembly.

Other objects of the present invention will be obvious to those skilled in the art from the following specification taken in conjunction with the attached sheet of drawings in which.

In general, the objects of the present invention are achieved by providing an insulating body in the form of a thin substantially cylindrical wafer of insulating material the outer periphery of which has a number of substantially semi-cylindrical or channel shaped cut-outs or notches formed therein. Spaced inwardly from the peripheral cut-outs are a series of annularly arranged rectangular apertures, one for each notch. The connector members each include a tube prong-receiving portion and a leg portion interconnected by a flat strap and one such connector is assembled in one peripheral cut-out and a rectangular aperture. Preferably all the connectors are assembled simultaneously in a die-pressing operation. The tube prong-receiving and leg portions of the connectors are initially bent at an angle of approximately 45° with respect to each other and the connectors are all then loosely assembled within the peripheral cut-outs and rectangular apertures of the wafer of insulating material. In the assembly process, force is exerted in a direction toward the wafer in order to force each connector member downwardly until the tube prong-receiving portion lies at a 90° angle to the leg portion. Also, during the assembling step, parts of the leg are flared outwardly adjacent the underside of the wafer and a pair of tongues on the innermost end of the tube prong-receiving portion are positioned adjacent and in contact with the upper and lower surfaces of the wafer so that all of the connectors are easily rigidly affixed simultaneously to the wafer in a simple single die-pressing operation.

Figure 1:
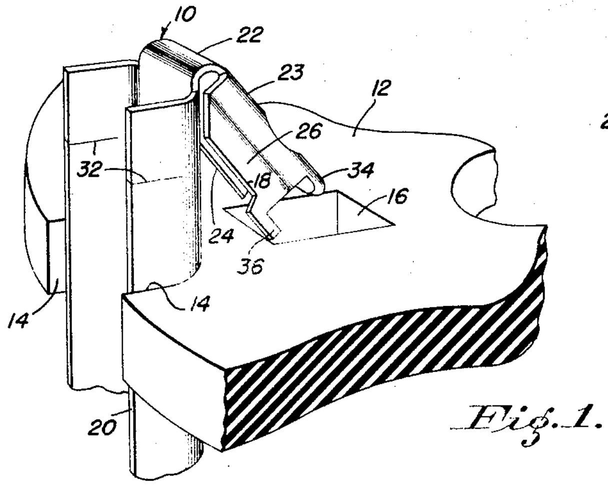
FIG. 1 is a perspective view of a section of an insulating body member or wafer with one of the connector members positioned with respect to the body to illustrate the initial step in a process whereby the connector is rigidly assembled to the wafer for example with a die-press machine.
Figure 4:
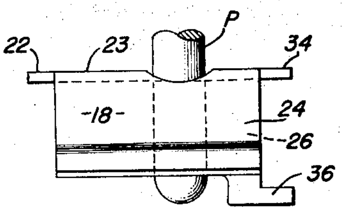
FIG. 4 is a side elevation of the tube prong-receiving portion of a connector member with a tube prong inserted therein.
Figures 2, 5:
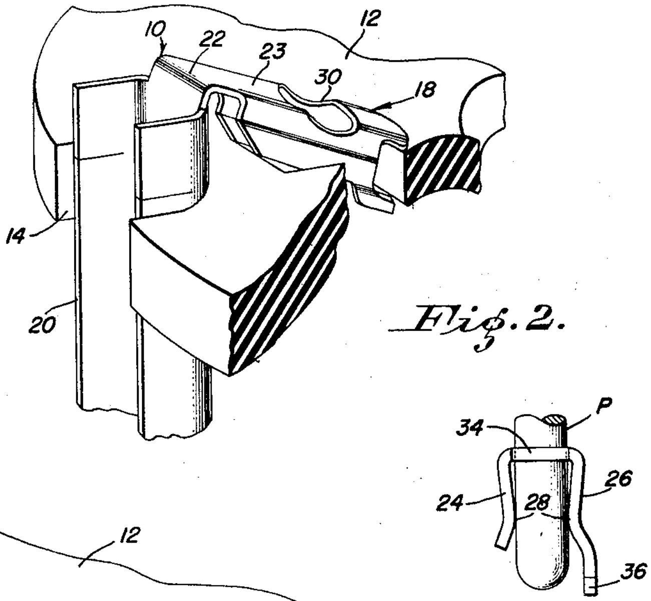
FIG. 2 is a view similar to FIG. 1 but showing a connector member in partially assembled relation.
FIG. 5 is a view taken at ninety degrees to FIG. 4 and showing the tube prong gripping action of the prong-receiving portion of the connector.
Figure 3:
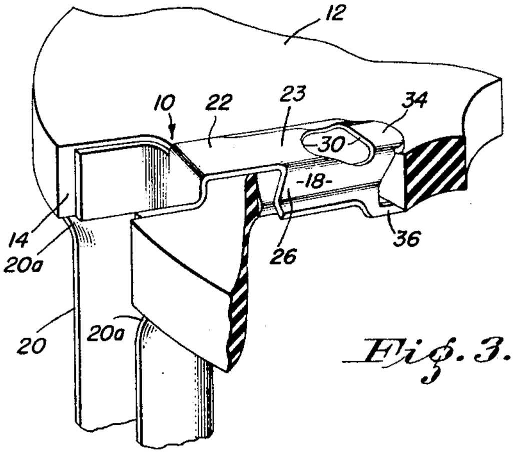
FIG. 3 is a view similar to FIGS. 1 and 2 in which the connector member has been completely assembled with and locked to the insulating body member.

Referring now to the drawings for a complete description of the present invention, FIGURES 1, 2 and 3 show the steps involved in the assembly of the connector 10 into the insulating wafer shaped body member 12. Although only a section of the insulating body member is shown in these figures, it will be appreciated that body 12 is substantially circular in outline and is of only sufficient thickness to provide a reasonably rigid supporting structure for the connector members. Formed in the periphery of the wafer 12 are a series of regularly spaced cut-outs or notches 14. Spaced radially inwardly from the cut-outs 14 and lying on the same radii as the cut-outs 14 are an annularly arranged series of apertures 16 which are substantially rectangular in outline.

Referring now to the connector members 10, each includes three basic parts namely a tube prong-receiving portion 18, a leg portion 20 and interconnecting strap 22. Both the tube prong-receiving and leg portions are substantially channel shaped in cross-section. The tube prong-receiving portion 18 has a top wall 23, formed as an extension of strap 22, and two side walls 24 and 26 which extend downwardly from opposite edges of top wall 23 and are bent inwardly and then outwardly as shown most clearly in FIGURE 5 to provide smooth gripping surfaces at 28 which will snugly engage the prong P of an electron tube but will not seize or bind thereon. An opening 30 is formed in the upper wall 23 of the tube prong-receiving portion 18 to provide for insertion of the tube prong from the upper side of the connector member.

As shown clearly in FIGURES 1–3 inclusive, the leg portions 20 of the connector members are also substantially channel shaped in cross-section and each preferably further includes adjacent its upper end, a pair of slits 32.

The purpose of the slits 32 is most clearly illustrated in FIG. 3 which shows the completely assembled relation of the connector and insulating body. Once the connector has been placed in the position shown in FIGURE 3, a portion of the die used in the assembly operation moves in from the side to flare outwardly the leg portions **20*a*, 20*a* below the line of the slits 32 and into snug engagement with the under side of the wafer body 12. These flared portions together with the strap portion 22 serve to lock the connector member in the insulating body. Further locking is also provided by the upper and lower tongues 34 and 36 which extend inwardly from the inner-most end of the tube prong-receiving portion 18. The tongue 36 engages the under side of the wafer 12 in the finally assembled position and the tongue 34 engages the upper side of the wafer 12. Each connector member therefore is rigidly secured to the insulating wafer body 12 by means of the flared portion of the legs on the under side of the wafer 12, the flat strap portion 22 which engages the upper surface of the wafer 12 and the tongues 34 and 36 which engage the upper and lower surfaces respectively of the wafer body 12**.

The end or lower portions of the legs 20, that is, those portions that are inserted within preformed openings in printed circuit panels are not shown in the drawings.

They are, however, completely described in our co-pending application Serial No. 25,911, filed May 2, 1960 now Patent No. 3,131,988. The particular configuration of the leg portions described in said co-pending application forms no part of the present invention as it is fully disclosed and claimed in said co-pending application.

From the foregoing, it will be apparent to those skilled in the art that there is herein shown and described a new and useful electron tube socket of the wafer type primarily for use in conjunction with printed circuit panels. It will be further apparent that the unitary assembly provides with an insulating body, a plurality of connector members which function to receive the tube prongs and which are rigidly interlocked with the insulating body members to form a rigid assembly.

While a preferred embodiment of our invention has been herein shown and described, applicants claim the benefit of a full range of equivalents within the scope of the appended claims.

We claim:

1. A wafer type electron tube socket for use in combination with printed circuit panels, comprising in combination: a support body consisting of a substantially flat disc of insulating material having a plurality of annularly arranged apertures therethrough each equidistant from the center of said disc; an equal number of notches in the edge of said disc lying on extension of the radii passing through said apertures; and an equal number of connectors each connector including a tube prong-receiving portion rigidly received in each of said apertures and an elongated leg portion received within said notches and extending axially from said disc, said leg portions each having outwardly flared portions adjacent the under side of and in engagement with said disc, said tube prong-receiving portion including a pair of spaced tongues, one positioned on each side of and in engagement with said disc, said prong-receiving and leg portions being connected by a flat strap which overlies said disc between said apertures and said notches.

2. A socket as defined by claim 1 in which said leg portions are channel shaped in cross-section and said notches are formed to snugly receive said leg portions.

3. A socket as defined by claim 1 in which said leg portions are slit and bent outwardly to form said outwardly flared portions.

4. A wafer type electron tube socket for use in combination with printed circuit panels comprising in combination: a support body consisting of a substantially circular flat disc of insulating material having a plurality of channel shaped notches formed in the periphery thereof, and an equal number of annularly arranged rectangular apertures therethrough, spaced inwardly from said notches and lying on the same radii therewith; an equal number of connectors each connector including a tube prong-receiving portion rigidly received in each of said apertures and an elongated channel shaped leg portion received within said notches and extending axially from said disc, each leg being slit and flared outwardly into engagement with the underside of the disc, said prong-receiving portions further including a pair of tongues at their innermost ends, engaging opposite sides of said disc, said prong-receiving portons and leg portions being interconnected by a flat strap which overlies said disc between said notches and apertures.

References Cited in the file of this patent

UNITED STATES PATENTS

| | | |
|---|---|---|
| 2,017,940 | Bessey | Oct. 22, 1935 |
| 2,741,751 | Weiler | Apr. 10, 1956 |
| 2,825,881 | Del Camp | Mar. 4, 1958 |
| 3,031,635 | Gluck | Apr. 24, 1962 |

FOREIGN PATENTS

| | | |
|---|---|---|
| 575,627 | Great Britain | Feb. 26, 1946 |